United States Patent [19]

Holler et al.

[11] Patent Number: 5,264,734
[45] Date of Patent: Nov. 23, 1993

[54] DIFFERENCE CALCULATING NEURAL NETWORK UTILIZING SWITCHED CAPACITORS

[75] Inventors: Mark A. Holler, Palo Alto; Simon M. Tam, Redwood City; Alan H. Kramer, Berkeley, all of Calif.

[73] Assignee: Intel Corporation, Santa Clara, Calif.

[21] Appl. No.: 885,529

[22] Filed: May 19, 1992

[51] Int. Cl.⁵ .......................................... H03K 19/08
[52] U.S. Cl. ..................................... 307/201; 395/24
[58] Field of Search .................. 307/201; 395/24, 21, 395/23

[56] References Cited

U.S. PATENT DOCUMENTS

| | | | |
|---|---|---|---|
| 4,956,564 | 9/1990 | Holler et al. | 307/201 |
| 4,961,002 | 10/1990 | Tam et al. | 307/201 |
| 4,999,525 | 3/1991 | Park et al. | 307/201 |
| 5,097,141 | 3/1992 | Leivian et al. | 307/201 |
| 5,136,177 | 8/1992 | Castro | 307/201 |
| 5,140,531 | 8/1992 | Engeler | 395/24 |

OTHER PUBLICATIONS

K. Suyama et al., "Simulation of Mixed Switched-Capacitor/Digital Networks with Signal-Driven Switches," IEEE Journal of Solid-State Circuits, vol. 25, No. 6, Dec., 1990.

*Primary Examiner*—Edward P. Westin
*Assistant Examiner*—Jan Santamauro

[57] ABSTRACT

A difference calculating neural network is disclosed having an array of synapse cells arranged in rows and columns along pairs of row and column lines. The cells include a pair of floating gate devices which have their control gates coupled to receive one of a pair of complementary input voltages. The floating gate devices also have complementary threshold voltages such that packets of charge are produced from the synapse cells that are proportional to the difference between the input and voltage threshold. The charge packets are accumulated by the pairs of column lines in the array.

17 Claims, 2 Drawing Sheets

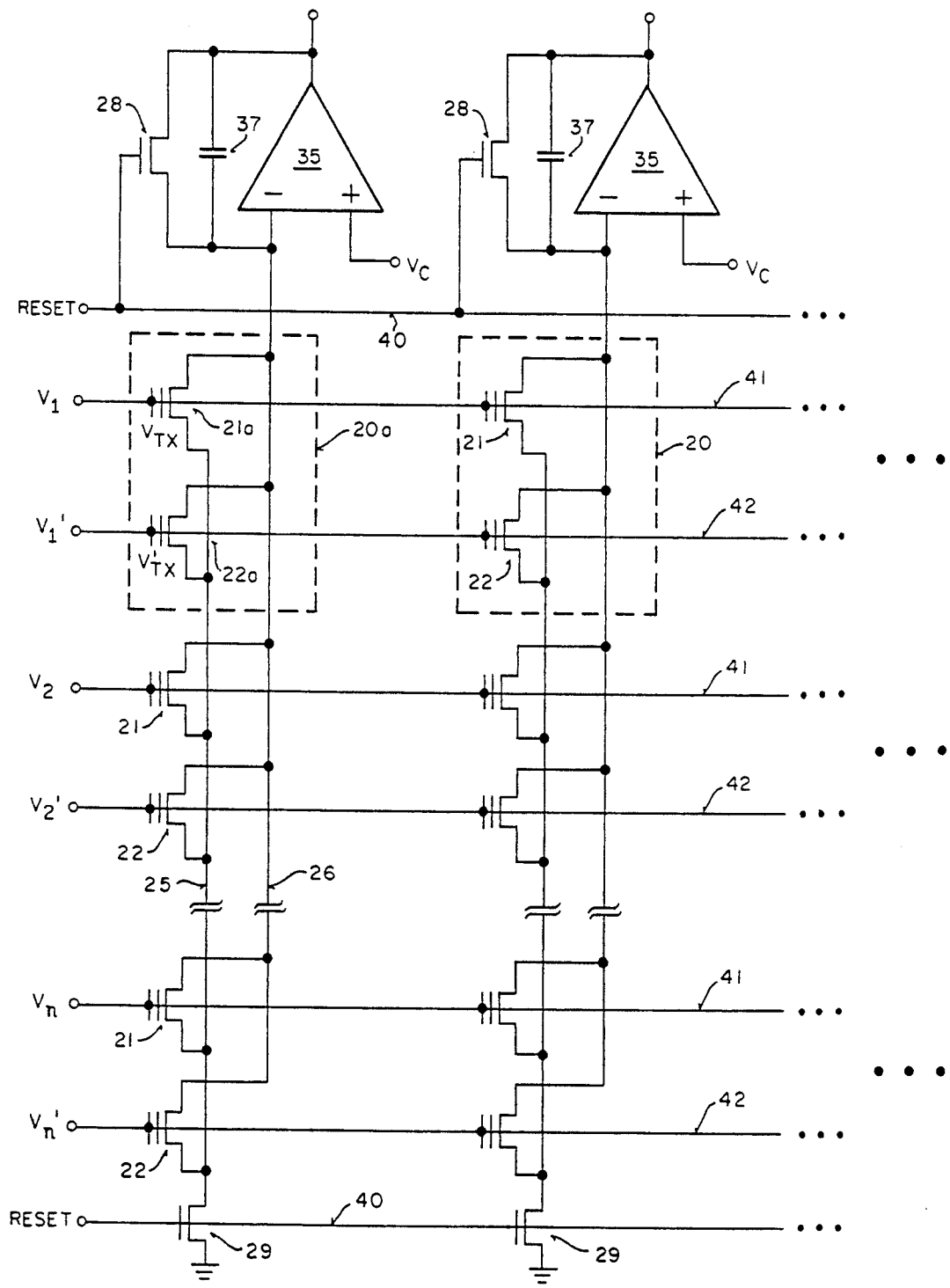
FIG_1

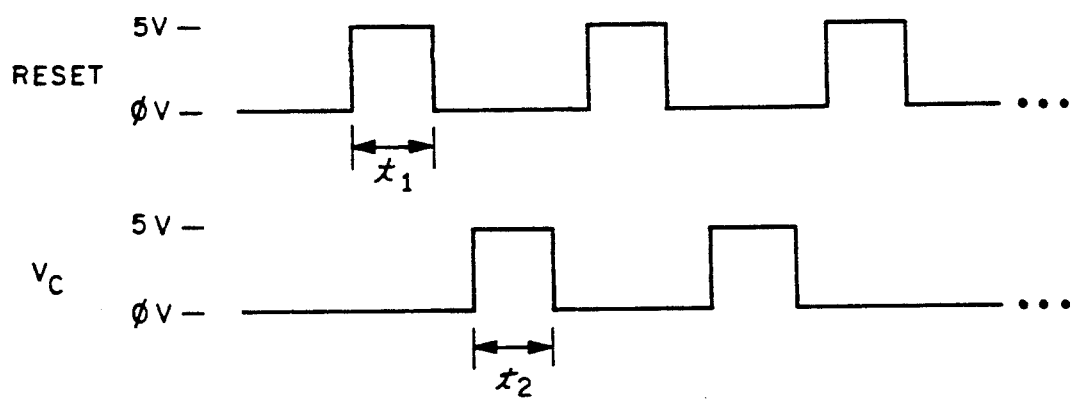
FIG_2
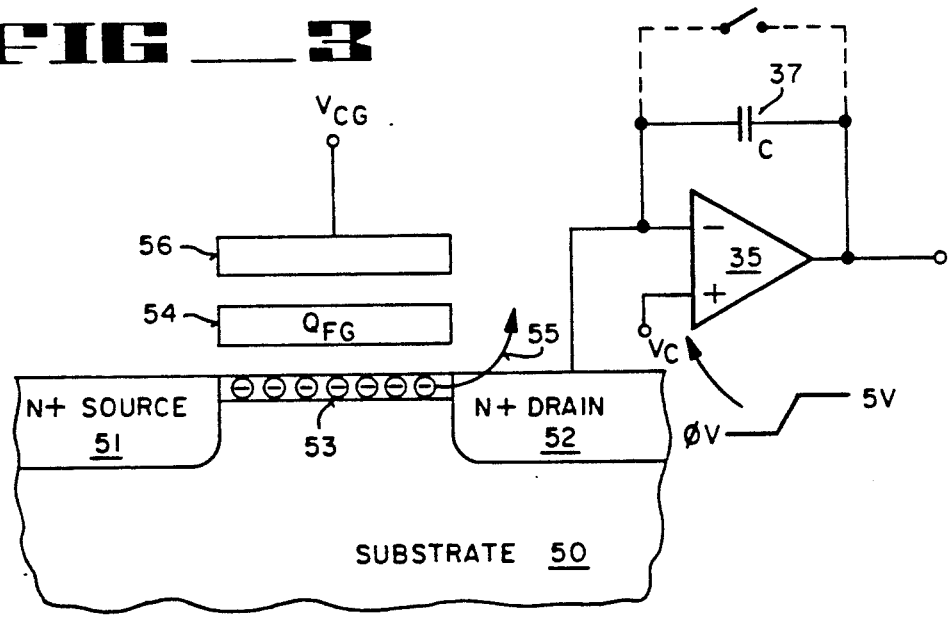
FIG_3
$$Q_{53} \propto [V_{CG} - V_{TX}]$$

DIFFERENCE CALCULATING NEURAL NETWORK UTILIZING SWITCHED CAPACITORS

FIELD OF THE INVENTION

The present invention is related to the field of artificial neural networks; more specifically, to circuits and methods for electrically implementing such networks utilizing floating gate devices.

BACKGROUND OF THE INVENTION

Artificial neural networks generally consist of multiple layers of neuron devices which provide massively parallel computing power. An intriguing feature of such networks is their adaptive capabilities which allow the network to learn new information. These characteristics provide parallel processing of information at high computational rates—far exceeding the performance of conventional Von Neumann computers which execute a program of instructions sequentially.

Neural networks generally take the form of a matrix of connections which simulate the function of a biological nervous system. Typically, electrical circuits are employed to provide variable strength synaptic connections between a plurality of inputs and a number of summing elements (i.e., neurons). The strength of the interconnections is commonly referred as the "weight" of the network. The synaptic weight, which frequently changes during the training or learning process, basically modulates the amount of charge or voltage input into each neuron within the network.

In the past, electrical synapse cells which employ floating gate devices have been used for storing connection weights in the form of electrical charge on the floating gate. In a floating gate device, current flow is modulated in a way which depends on the value of the stored electrical charge. In these cells, a dot product calculation is normally performed wherein the applied input voltage is multiplied by the stored weight to produce an output. This output is then summed with other outputs in the network. Examples of semiconductor synapse cells which employ floating gate devices for storing weights are found in U.S. Pat. Nos. 4,956,564 and 4,961,002.

Another category of neural network computes the difference between the input value and stored weight value. This type of network performs what is frequently referred to as a "Manhattan Distance" or "City Block Distance" calculation. Both the multiplication and difference types of neural networks are equally capable of solving computational tasks such as associative memory and pattern classification.

As will be seen, the present invention discloses a neural network which calculates the absolute "City Block Distance" between an input voltage and a stored weight. The invented network utilizes switched-capacitor circuitry and floating gate devices for emulating the function of a biological synapse.

Other prior art known to applicant includes an article by K. Suyama et al., entitled, "Simulation of Mixed Switched-Capacitor/Digital Networks with Signal-Driven Switches," IEEE Journal of Solid-State Circuits, Vol. 25, No. 6, December 1990.

SUMMARY OF THE INVENTION

A difference calculating neural network is disclosed which comprises an array of synapse cells arranged in rows and columns. Coupled to each row of cells within the array is a pair of input row lines. Each pair of row lines provide complementary input voltages to the cells located within that row. Similarly, the network also includes a plurality of column summing lines, wherein pairs of column lines are coupled to all of the cells located in the same column of the array.

In a particular embodiment, each synapse cell includes first and second floating gate devices—both of the devices have their sources coupled to a first column line and their drains coupled to a second column line. The control gates of the floating gate devices are each coupled to receive one of the complementary input voltages along first and second row lines, respectively.

The floating gate devices also have complementary voltage thresholds. The application of a pair of complementary input voltages to a pair of floating gate devices that have complimentary threshold voltages produces packets of charge from the individual synapse cells. The amount of charge within the packet is proportional to the difference between the applied input voltage and the associated threshold voltage for that cell.

The network also includes a means for accumulating the charge packets along associated pairs of column lines. The accumulating means preferably comprises a switched capacitor network including an operational amplifier configured as an integrator. A resetting means is also included for discharging the accumulated charge after the difference calculation has been performed.

One of the salient features of the present invention is the fact that the synaptic array is suitable for implementation as an array of flash devices. Practitioners in the art appreciate that flash devices offer numerous advantages including the ability to erase the programming state of all of the floating gate devices in a single operation (or, alternatively, on a block-by-block basis). In a preferred embodiment, flash EPROM devices are employed in the synapse cells.

BRIEF DESCRIPTION OF THE DRAWINGS

The present invention will be understood more fully from the detailed description which follows and from the accompanying drawings, which, however, should not be taken to limit the invention to the specific embodiments shown but are for explanation and understanding only.

FIG. 1 is a circuit schematic diagram showing the basic architecture of the neural network of the present invention.

FIG. 2 illustrates the timing relationship between two control signals used in the operation of one embodiment of the present invention.

FIG. 3 is a cross-sectional view of a floating gate device which modulates charge flow in its channel region based on the value of a stored weight and an input voltge.

DETAILED DESCRIPTION

A switched capacitor difference calculating neural network is described. In the following description, numerous specific details are set forth, such as specific voltages, conductivity type, timing relationships, etc., in order to provide a thorough understanding of the present invention. It will be obvious, however, to one skilled in the art that these specific details may not be needed to practice the present invention. In other instances, well-known structures and circuits have not been shown or explained in detail in order to avoid unnecessarily obscuring the present invention.

FIG. 1 illustrates a circuit schematic of the basic array architecture of the presently invented neural network. The array comprises a plurality of synapse cells 20 which are arranged in rows and columns throughout the array. Each cell 20 includes a pair of floating gate devices 21 and 22 which, in the currently preferred embodiment, comprise electrical probrammable read-only memories (EPROMs). The EPROM devices are of a type which are programmed by hot electron injection from the channel to the floating gate member. Practitioners in the art will appreciate that the array portion of the network of FIG. 1 can be implemented using well-known flash EPROM array structures. Programming and erasing operations of individual cells in EPROM arrays are well understood in the art.

The floating gate devices which comprises individual synapse cells 20 are each coupled to a pair of row lines 41 and 42, and also to a pair of column lines 25 and 26. Row lines 41 and 42 are coupled to all of the cells within the same row of the array. Similarly, column lines 25 and 26 are coupled all of the cells in the same column. By way of further example, within synapse cell 20a, floating gate device 21a has its drain coupled to column line 26 and its source coupled to column line 25. The control gate of floating gate device 21a is coupled to row line 41 and the control gate of device 22a is couple to row line 42. (It should be understood that row lines 41 and 42 extend fully across the array—typically in a horizontal direction—whereas column lines 25 and 26 extend across the array—typically in a vertical direction. In general, the synaptic array portion of the network shown in FIG. 1 consists of N rows and M columns, where N and M are both integers. The size of the array determines the available computing power.

The synapse cells of the present invention are each programmed to store an electrical charge on their floating gates. This electrical charge corresponds to the weight or interconnection strength of the network. The magnitude of the floatng gate charge determines the threshold voltage of the device. In accordance with the present invention, each of the floating gate devices of a synapse cell is programmed to have complementary voltage thresholds. For example, in synapse cell 20a, device 21a is shown being programmed to a voltage threshold $V_{TX}$, while device 22a is shown having a complementary voltage threshold $V'_{TX}$. In the currently preferred embodiment, the complementary voltage threshold is calculated by the difference between the voltage threshold $V_{TX}$ and a reference or operating supply potential. For example, for a 5 volt supply potential, $V'_{TX} = 5$ volts $-V_{TX}$.

During normal operation, an input voltage and its complement are provided along pairs of row lines 41 and 42. In FIG. 1, for example, input voltage $V_1$ is shown being applied along row line 41, connected to the control gates of devices 21 in the first row of the array. Likewise, a complementary input voltage $V_1'$ is coupled along line 42 to the control gates of all of the devices 22 located within the same row. Note that the complementary input voltages are also calculated with respect to a reference or operating supply potential. For example, for a 5 volt supply potential, $V_1' = 5$ volts$-V_1$.

Collectively, the input voltages $V_1$ to $V_n$ (and their complements) comprise an input vector to the network. These voltages can be either analog or digital (i.e., binary) in nature. The network itself functions to calculate the city block distance between this applied input vector and a weight vector stored in the synapse cells of the array. The city block distance between two vectors $\vec{V}$ and $\vec{W}$ is defined by the following equation City Block Distance
$$(\vec{V}, \vec{W}) = |V_1 - W_1| + |V_2 - W_2| + \ldots |V_n - W_n|$$

Individually, each synapse cell operates as a type of charge domain device which calculates the absolute difference between an input voltage (coupled to the control gates of the floating gate devices) and the stored weight (as represented by the floating gate thresholds).

Charge packets developed within individual synapse cells are accumulated and summed along their associated column lines utilizing a switched-capacitor network. Each column of the array has its own associated switched-capacitor network. The switched-capacitor circuitry comprises an operational amplifier (op amp) 35, a capacitor 37 and a switching device 28. As shown in FIG. 1, capacitor 37 is coupled between the negative input of op amp 35 and its output. Switch 28, which typically comprises an ordinary n-channel field-effect device, is coupled in parallel across capacitor 37. The positive input of amplifier 35 is coupled to a control voltage, $V_C$. The negative input to amplifier 35 is also coupled to column line 26 of the array. Column line 25 is selectively coupled to ground through field-effect device 29. The gates of devices 29 are coupled to a reset line 40. Line 40 is utilized for discharging capacitor 37 and also for removing any charge present in the channel regions of devices 21 or 22 within the array. When line 40 is raised to a high potential, transistors 29 turn on, discharging capacitor 37 and column line 25. A reset operation is normally done prior to performing the difference calculations.

The network of FIG. 1 has two phases of operation. During the first phase, charges are developed within the channel region of either device 21 or 22. These charges are proportional to the absolute differences between the applied input voltage and the stored weight within the individual cells. In the second phase of operation, the charge packets associated with the synapse cells on the same column within the array are integrated to generate a sum of absolute differences which represent the city block distance for that column. The integration utilizes the switched-capacitor circuitry which includes op amp 35. Op amp 35 outputs a voltage after the integration that may then be operated upon by a Sigmoid function.

Referring now to FIG. 2, a typical timing sequence used in the operation of the network of FIG. 1 is shown. During the first phase of operation, the reference voltage $V_C$ is at ground potential. Because of the virtual ground connection through amplifier 35, column line 26 is also at ground potential. When a reset pulse is applied to line 40 of the network, transistors 29 are turned on to discharge capacitor 37 and column lines 25, respectively. The reset pulse supplied to line 40 has a duration $t_1$, which should be long enough to fully discharge capacitor 37 and line 25. At this point, both column lines 25 and 26 are at ground potential.

In the second phase of operation, the reset line first drops low to turn off devices 29, thereby disconnecting column lines 25 from ground potential. After the reset pulse drops low, and before the control voltage $V_C$ transitions high, charge is developed in the channel regions of the floating gate devices in response to the applied input voltages.

FIG. 3 is a cross-sectional view of a floating gate device which illustrates the development of this charge. The device of FIG. 3 has a control gate 56, a floating gate member 54, and source and drain regions 51 and 52, respectively. The electrical charge stored on floating gate 54 is represented as $Q_{FG}$. In the presence of an applied control gate voltage, $V_{CG}$, a charge 53 is developed in the channel region of the device. The magnitude of charge $Q_{53}$ is proportional to the difference between the applied control gate voltage and the programmed threshold voltage. Mathematically, this relationship is given by $$Q_{53} \propto [V_{CG} - V_{TX}]$$

It should be understood that only one of the floating gate devices in a given synapse cell is normally turned on. This is due to the complementary nature of the inputs and the programmed voltage thresholds. For example, in FIG. 1, if $V_1$ is relatively high with respect to $V_{TX}$, then device 21a is turned on. At the same time—because of the complementary nature of the inputs and threshold voltages—device 22 is off. Likewise, if $V_1'$ is greater than $V_{TX}$ then device 22 is turned on, and device 21a is turned off. (Note that if the input voltage exactly matches the voltage threshold of the transistor, no charge resides within the channel of either device.)

Returning to the previous example, just prior to the low-to-high transition of the reference voltage, $V_C$, the source/drain regions are at ground potential. However, as the positive terminal of op amp 35 transitions from ground to some positive potential (e.g., 5 volts), all of the "on" transistors in the same column of the array go from an inversion state to being cut-off. This change occurs as the drain node (coupled to column line 26) of each transistor rises. Cut-off occurs when the channel region of the device eventually pinches off. For example, as $V_C$ rises from zero volts to five volts, line 26 (coupled to the drains of devices 21 and 22) also rises concurrently. The source nodes coupled to line 25 will follow the drain node so long as any of the transistors are still turned on. As the potential of source line 26 rises, any charge resident in the channels of either devices 21 or 22 (the one with the inversion layer) is transferred to the summing line and eventually ends up on the integrating capacitor 37. This is illustrated in FIG. 3 by arrow 55. In other words, as $V_C$ gradually ramps up in potential, operational amplifier 35 drives column lines 26 to virtually the same potential at essentially the same time.

When all of the transistors coupled to line 26 have been cut-off, the output of amplifier 35 will be at a voltage $V_{OUT}$, given by the equation $$V_{OUT} = V_C - \frac{C_G}{C_F} \sum_i (V_{CGi} - V_{TXi})$$

where $V_{OUT}$ is the output of the amplifier, $C_G$ is the floating gate-to-channel capacitance of the EPROM, and $C_F$ is the capacitance of capacitor 37.

At this stage of operation, capacitor 37 holds the sum of all of the charge packets previously stored in the channel regions of the individual synapse cells of the associated column. At the end of the second cycle of operation, the control voltage $V_C$ transitions low and the entire process can then be repeated, for a new input and weight if desired.

Practitioners in the art will appreciate that the transition of $V_C$ has an associated slew rate. One requirement of this slew rate is that it not be so fast as to shut off all the transistors in the column before they can transfer their charge packets onto summing line 26. If the slew rate is too fast, the charge packets will simply be dumped into the substrate. Similarly, the duration $t_2$ of the $V_C$ pulse should be long enough so that amplifier 35 can properly accumulate and integrate all of the charge being received from column line 26.

In the previous discussion, one problem that may arise is that as the voltages are changed on the source and drain nodes of the device, the junction capacitance associated therewith also changes as a function of the applied voltage. This leads to an error charge, $Q_E$, which may alter the basic calculation as shown by the following relationship.

$$Q \propto [V_{CG} - V_{TX}] + Q_E$$

One way to avoid this error charge is to change the input voltage rather than the control voltage $V_C$. That is, $V_C$ is held at a constant voltage (e.g., 0 volts) during the second cycle of operation. Instead of transitioning the positive input of amplifier 35, the row line voltages coupled to the control gates of devices 21 and 22 are ramped from their initial input values down to ground. As before, the slew rate of the input voltages should not be too fast, otherwise charge will simply be dumped into substrate 50 rather than onto capacitor 37. The timing relationship between the input voltages transitions and the reset pulse remains the same.

Although the present invention has been described in conjunction with certain embodiments, it is appreciated that the invention may be implemented in a variety of ways. Consequently, it is to be understood that the particular embodiments shown and described by way of illustration are in no way intended to limit the scope of the claims, which themselves recite only those features regarded as essential to the invention.

What is claimed is:

1. A neural network comprising an array of synapse cells arranged in rows and columns;
   a plurality of input row lines, pairs of said row lines providing complementary input voltages to a row of said cells;
   a plurality of column summing lines, pairs of said column lines being coupled to a column of said cells;
   each synapse cell comprising first and second floating gate devices each having their sources coupled to a first column line and their drains coupled to a second column line, said devices having their control gates coupled to receive said complementary input voltages along first and second row lines, respectively;
   said first and second devices being programmed to first and second threshold voltages, respectively, wherein said second threshold voltage is the complement of said first threshold voltage and is calculated as the difference between said first threshold voltage and a reference potential such that said cells produce packets of charge which are proportional to the city block distance between said input voltage and said threshold voltage;

said network further comprises a switched-capacitor circuit for accumulating said charge packets along said pairs of said column lines.

2. The neural network of claim 1 wherein said switched-capacitor circuit comprises a capacitor and an operational amplifier configured as an integrator, said capacitor being coupled to one of said pairs of said column lines.

3. The neural network of claim 2 wherein said accumulating means further comprises a means for resetting set network by discharging at least one of said column lines and said capacitor.

4. The neural network of claim 3 wherein said accumulating means further comprises a control means for transferring said packets of charge from said cells to said capacitor along said pairs of column lines.

5. The neural network of claim 4 wherein said control means comprises a means for applying a voltage transition to said operational amplifier.

6. The neural network of claim 5 wherein said control means further comprises a reference voltage coupled to said operational amplifier and a means for slewing said input voltages to a low potential.

7. The neural network of claim 1 wherein said array comprises flash devices.

8. The neural network of claim 7 wherein said cells comprise EPROMs.

9. A synapse cell for calculating the city block distance between an applied input voltage and a stored weight comprising:
   a pair of column lines;
   a pair of floating gate devices coupled in parallel across said column lines, said pair of devices being programmed to first and second threshold voltages, respectively, wherein said second threshold voltage is the complement of said first threshold voltage and is calculated as the difference between said first threshold voltage and a reference potential, said first and second threshold voltages representing said stored weight;
   a pair of input row lines providing an input voltage and its complement to said floating gate devices, each device having its control gate coupled to a different one of said row lines;
   wherein an electrical charge is formed in the channel of one of said devices, said charge being proportional to the city block distance between said input voltage and said stored weight.

10. The synapse cell of claim 9 wherein said floating gate devices comprise EPROMs.

11. A neural network comprising:
   a plurality of synapse cells arranged in rows and columns so as to form an array, each cell including first and second floating devices which each device having a control gate, source and drain regions, and a floating gate for storing an electrical charge which determines the threshold voltage of said device, said first and second devices having first and second threshold voltages, respectively, wherein said second threshold voltage is the complement of said first threshold voltage and is calculated as the difference between said first threshold voltage and a reference potential;
   a plurality of row lines, pairs of said row lines being coupled to all of the cells in the same row wherein one row line carrying a first input voltage is coupled to the control gate of said device, and the other row line carrying a second input voltage is coupled to the control gate of said second device, said second input voltage being the complement of said first input voltage;
   a plurality of column lines, pairs of said column lines being coupled to all of the cells in the same column wherein one column line is coupled to the source regions, and the other column line is coupled to the drain regions of said cells;
   and further wherein a channel charge is developed in either said first or said second device in response to either said first or said second input voltage, said channel charge being proportional to the city block distance between either said first input voltage and said first threshold voltage, or said second input voltage and said second threshold voltage;
   said neural network further comprising a switched-capacitor circuit for accumulating all of the channel charges developed in the same column of cells within said array.

12. The neural network of claim 11 wherein said array comprises flash devices.

13. The neural network of either claims 11 or 12 wherein said second input voltage represents the difference between an operating potential and said first input voltage.

14. The neural network of claim 13 wherein said switched-capacitor network includes an operational amplifier having positive and negative inputs and an output, said network also including a capacitor coupled between said output and said negative input of said operational amplifier, said negative input also being coupled to said other column line of said network.

15. The neural network of claim 14 further comprising a means for discharging said channel charges within said network.

16. The neural network of claim 13 wherein said switched-capacitor network further comprises a means for causing said channel charges to be transferred from said cells to said capacitor.

17. The neural network of claim 13 wherein said devices comprise EPROMs.

* * * * *